Nov. 23, 1971 H. M. PATEL 3,621,562

METHOD OF MANUFACTURING INTEGRATED CIRCUIT ARRAYS

Filed April 29, 1970 8 Sheets-Sheet 1

INVENTOR
HASMUKH M. PATEL
BY David M Keay
AGENT

INVENTOR
HASMUKH M. PATEL
BY David M. Keay
AGENT

METHOD OF MANUFACTURING INTEGRATED CIRCUIT ARRAYS

Filed April 29, 1970 8 Sheets-Sheet 3

INVENTOR
HASMUKH M. PATEL

BY David M. Keay

AGENT

Nov. 23, 1971 H. M. PATEL 3,621,562

METHOD OF MANUFACTURING INTEGRATED CIRCUIT ARRAYS

Filed April 29, 1970 8 Sheets-Sheet 4

INVENTOR
HASMUKH M. PATEL
BY David M. Keay
AGENT

INVENTOR
HASMUKH M. PATEL
BY David M. Kay
AGENT

INVENTOR
HASMUKH M. PATEL
BY David M. Keay
AGENT

INVENTOR
HASMUKH M. PATEL
BY David M. Kay
AGENT

Nov. 23, 1971 H. M. PATEL 3,621,562

METHOD OF MANUFACTURING INTEGRATED CIRCUIT ARRAYS

Filed April 29, 1970 8 Sheets-Sheet 8

INVENTOR
HASMUKH M. PATEL
BY David M. Kay
AGENT

United States Patent Office 3,621,562

Patented Nov. 23, 1971

3,621,562

METHOD OF MANUFACTURING INTEGRATED CIRCUIT ARRAYS

Hasmukh M. Patel, Woburn, Mass., assignor to Sylvania Electric Products Inc.

Filed Apr. 29, 1970, Ser. No. 32,934
Int. Cl. B01j *17/00;* H01l *1/16*
U.S. Cl. 29—577 8 Claims

ABSTRACT OF THE DISCLOSURE

Method of metallizing an integrated circuit network containing an array of identical cells to produce a specific subsystem. Each identical cell includes several groups of components, each group being capable of being interconnected in several different arrangements to form several different basic logic circuits. A first identical metallization pattern is placed on each cell of the array and includes all the different arrangements of interconnections between the components of each group of the cell, and also a block of metal adjacent the cell. To commit each cell to a specific logic arrangement, metal is removed so that each group becomes one specific basic logic circuit and so that the block of metal becomes a first set of discrete conductive paths. A layer of non-conductive material is applied over the array, openings are made therein to expose appropriate areas of the first metallization, and then a second metallization pattern is applied to form a second set of conductive paths generally transverse to the first set. The second set in conjunction with the first set interconnects the basic logic circuits into a specific subsystem.

BACKGROUND OF THE INVENTION

This invention relates to semiconductor monolithic integrated circuit networks. More particularly, it is concerned with methods of producing electrical interconnections between the components of a monolithic integrated circuit network containing an array of individual circuits arranged in standard cells.

The art of integrated circuits in which several components are fabricated within a single block of semiconductor material has progressed rapidly to the point where the components for performing several circuit functions may be formed in a single block of semiconductor material. The incorporation of a large number of individual circuits interconnected to provide a complete system in a single block of semiconductor material has been designated LSI (large scale integration). To date LSI has been employed most effectively in digital logic apparatus which include large numbers of a few different logic circuits. Since only a relatively small number of different logical functions are required to provide a variety of complex subsystems, identical blocks of semiconductor material containing a plurality of each of several basic logic circuits can be fabricated into different subsystems as determined by the circuit interconnections.

In the fabrication of large scale integrated circuit networks for digital logic apparatus, from one to several networks may be produced simultaneously in a single slice of semiconductor material, typically silicon. The components are formed by the conventional procedures of selectively diffusing conductivity type imparting materials through openings in an adherent protective coating, typically silicon oxide, on the surface of the slice. The components of each network are arranged in an array of standard cells. The components of each cell may be interconnected to form one or more different types of logic circuits, and the logic circuits may be interconnected to form the desired subsystem.

In the production of digital logic subsystems in this manner, it is common practice to fabricate identical arrays of standard cells. Then, in order to customize an array into a specific subsystem, metal interconnections are formed by conventional means to interconnect the components of selected cells to provide the appropriate basic logic circuits for the subsystem. Next, a layer of non-conductive material is applied, suitable openings are made therein, and a second layer of metal interconnections is formed. Since the interconnections of each layer cannot cross each other, for subsystems of any complexity the second layer of interconnections does not provide all the necessary connections between the basic logic circuits. Therefore, it is common practice for the interconnections of the second layer to extend generally in one direction, and a third layer of metal interconnections which make connections to the second layer and which extend transverse to those of the second layer is applied over another intervening layer of non-conductive material. Thus, three layers of metal interconnections with intervening non-conductive layers are required to provide the necessary electrical connections of the subsystem.

SUMMARY OF THE INVENTION

The method in accordance with the invention of fabricating an integrated circuit network containing an array of standard cells simplifies processing and advances processing of the networks to a further stage toward completion before the array is committed to a specific network arrangement. In accordance with the method of the invention a body of semiconductor material is produced having a plurality of groups of components fabricated therein. Each of the components has terminal areas in a surface of the body at which electrical connections can be made to the components. An adherent non-conductive coating with openings therein exposing the terminal areas of the components covers the surface of the body. The components of each group are capable of forming a different functional circuit arrangement for each of several different possible sets of electrical connections between terminal areas of the components in the group. A first layer of conductive material is placed on the non-conductive coating and on exposed terminal areas in a predetermined pattern of conductive members to provide the several different possible sets of electrical connections between the terminal areas of the components of each group. At the same time, a block of conductive material is placed on the non-conductive coating adjacent the groups of components.

At this point, the assembly is a standardized arrangement of groups of components which, although provided with interconnections, have not yet been committed as to specific logic function nor as to the pattern of interconnections between the groups.

When the decision has been made to customize the array as a specific network, conductive material of the conductive members is selectively removed to leave conductive members providing a single set of electrical connections for the components of each group whereby the components of each group form a desired functional circuit arrangement. The conductive material of the block is also selectively removed to provide a multiplicity of conductive paths. Next, the entire surface of the assembly is covered with a layer of non-conductive material, and material of the layer is removed to expose selected areas of the first layer of conductive material. A second layer of conductive material is placed on the layer of non-conductive material and on the exposed areas of the first layer of conductive material in a desired pattern of a multiplicity of conductive paths so that the conductive paths of the first layer and of the second layer provide electrical connections between the groups of components.

BRIEF DESCRIPTION OF THE DRAWINGS

Additional objects, features, and advantages of the method of manufacturing integrated circuit networks in accordance with the invention will be apparent from the following detailed discussion and the accompanying drawings wherein.

DETAILED DESCRIPTION OF THE INVENTION

Figure 1:
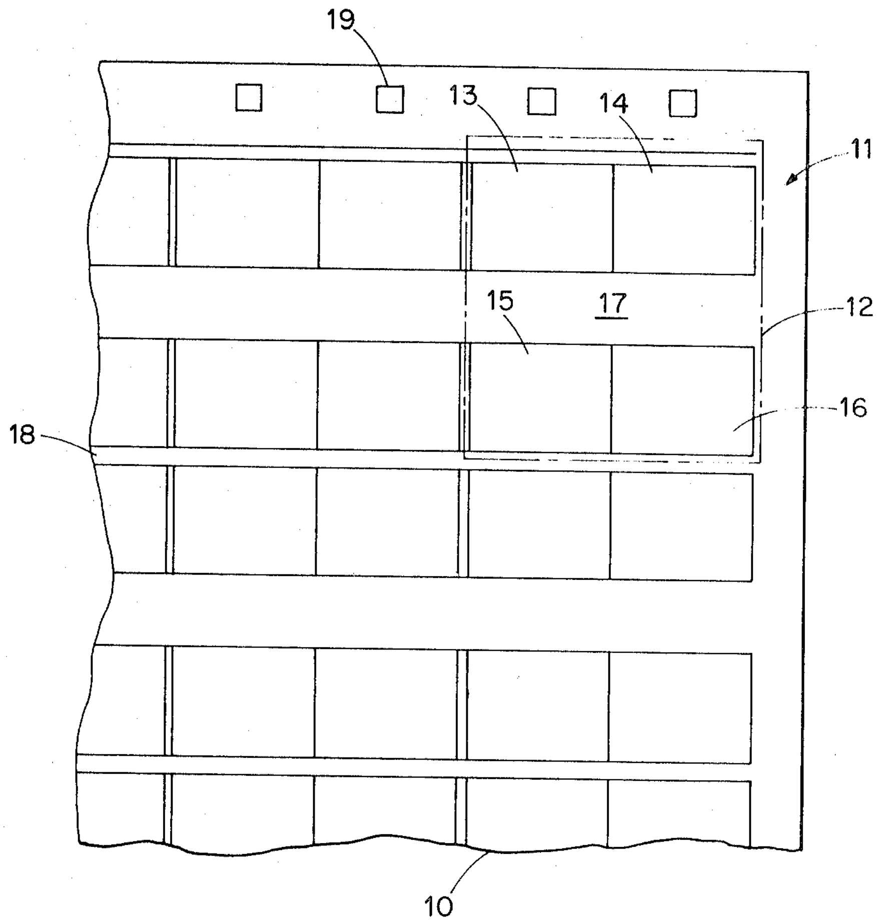
FIG. 1 is a layout diagram of a portion of an integrated circuit structure fabricated in accordance with the method of the invention.

In the fabrication of the components of integrated circuit networks by the selective diffusion of conductivity type imparting materials into a body of semiconductor material, a large number of components which may constitute several integrated circuit networks may be produced within a single wafer of semiconductor material. FIG. 1 is a layout of a portion of an integrated circuit network which may be one of several networks fabricated in a wafer 10 of semiconductor material, specifically silicon. Only a portion of the network is illustrated in the layout diagram of FIG. 1.

As illustrated in FIG. 1 the integrated circuit network includes an array of identical cells 11, one of which is enclosed by the dashed line 12. Each cell contains four groups of components 13, 14, 15, and 16. The components of each group may be connected together in different possible arrangements to form various digital logic circuits. In the particular array described herein, the first, third, and fourth groups 13, 15, and 16 of each cell contain electrically identical components. The second group 14 is more complex and thus is capable of providing additional logic functions.

The cells 11 of the array are arranged in a coordinate matrix of aligned horizontal rows and vertical columns. The groups of components are also arranged in horizontal rows and vertical columns. The four groups within each cell are arranged in two pairs with each pair in a different row. An avenue 17 not containing any components lies between the pairs. The avenues 17 are disposed parallel to the rows and pass through the central portions of all the cells in a row. The rows of cells are separated by intervening gaps 18 which extend parallel to the avenues. Electrical conductors are placed in the avenues 17 and gaps 18, as will be explained hereinbelow. Bonding pads 19 for permitting electrical connections to be made into and out of the network are placed about the periphery of the array.

Figure 2:
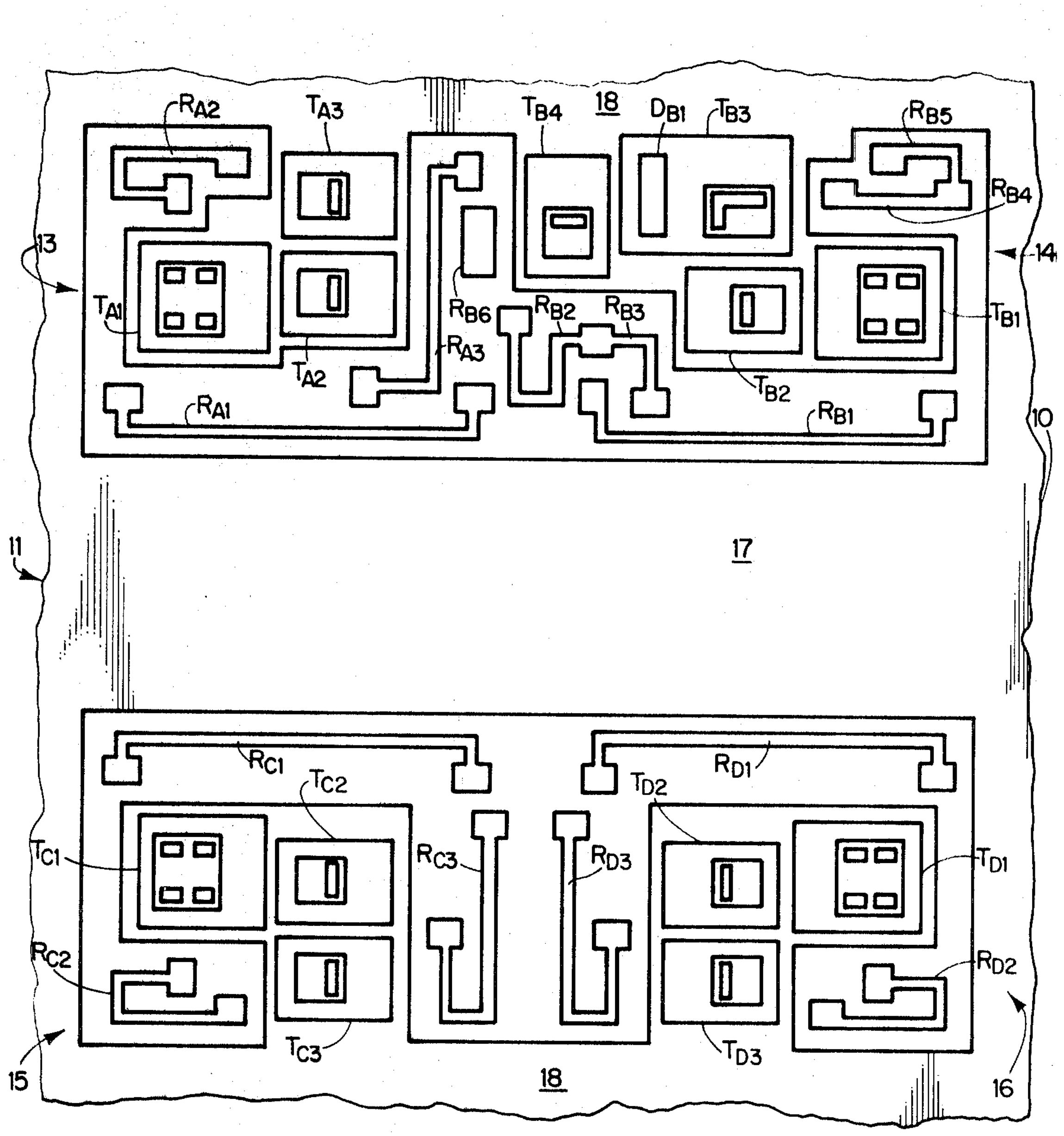
FIG. 2 is a plan view of a fragment of a wafer of semiconductor material showing the components of a single cell of an array.

FIG. 2 is a plan view of a fragment of the wafer 10 illustrating one of the cells 11 as enclosed by the dashed line in FIG. 1. The cell is shown after the active and passive components have been formed by conventional selective diffusion techniques. The surface of the wafer is coated with protective non-conductive insulating material, specifically silicon oxide.

The components of the cell are arranged in four groups 13, 14, 15, and 16. The components of three of the groups 13, 15, and 16 are electrically identical. The components of the three groups are a multi-emitter transistor $T_{A1}$; $T_{C1}$; and $T_{D1}$ two other transistors $T_{A2}$, $T_{A3}$; $T_{C2}$, $T_{C3}$; and $T_{D2}$, and $T_{D3}$ and three resistances $R_{A1}$, $R_{A2}$, $R_{A3}$; $R_{C1}$, $R_{C2}$, $R_{C3}$; and $R_{D1}$, $R_{D2}$, $R_{D3}$. The other group 14 of components includes one multi-emitter transistor $T_{B1}$, three other transistors $T_{B2}$, $T_{B3}$, and $T_{B4}$, one diode $D_{B1}$, and four resistances, two of which are divided so as to provide a total of six resistive elements $R_{B1}$, $R_{B2}$, $R_{B3}$, $R_{B4}$, $R_{B5}$, and $R_{B6}$. The components of each group may be interconnected in different circuit arrangements to provide different logic functions as will be explained hereinbelow.

Each of the components has terminal areas in the surface of the silicon wafer to permit electrical connections to be made to the components. The adherent coating of silicon oxide has openings therein which expose the terminal areas of the components. The locations of the terminal areas and the opening in the silicon oxide are not specifically indicated in FIG. 2, but will be apparent from other figures of the drawings as discussed hereinbelow.

Each pair of groups 13 and 14, and 15 and 16 of the cell are separated by an intervening avenue 17 which contains no components. Each cell is separated from the cell of the adjacent row by a gap 18 which contains no components.

Figure 3:
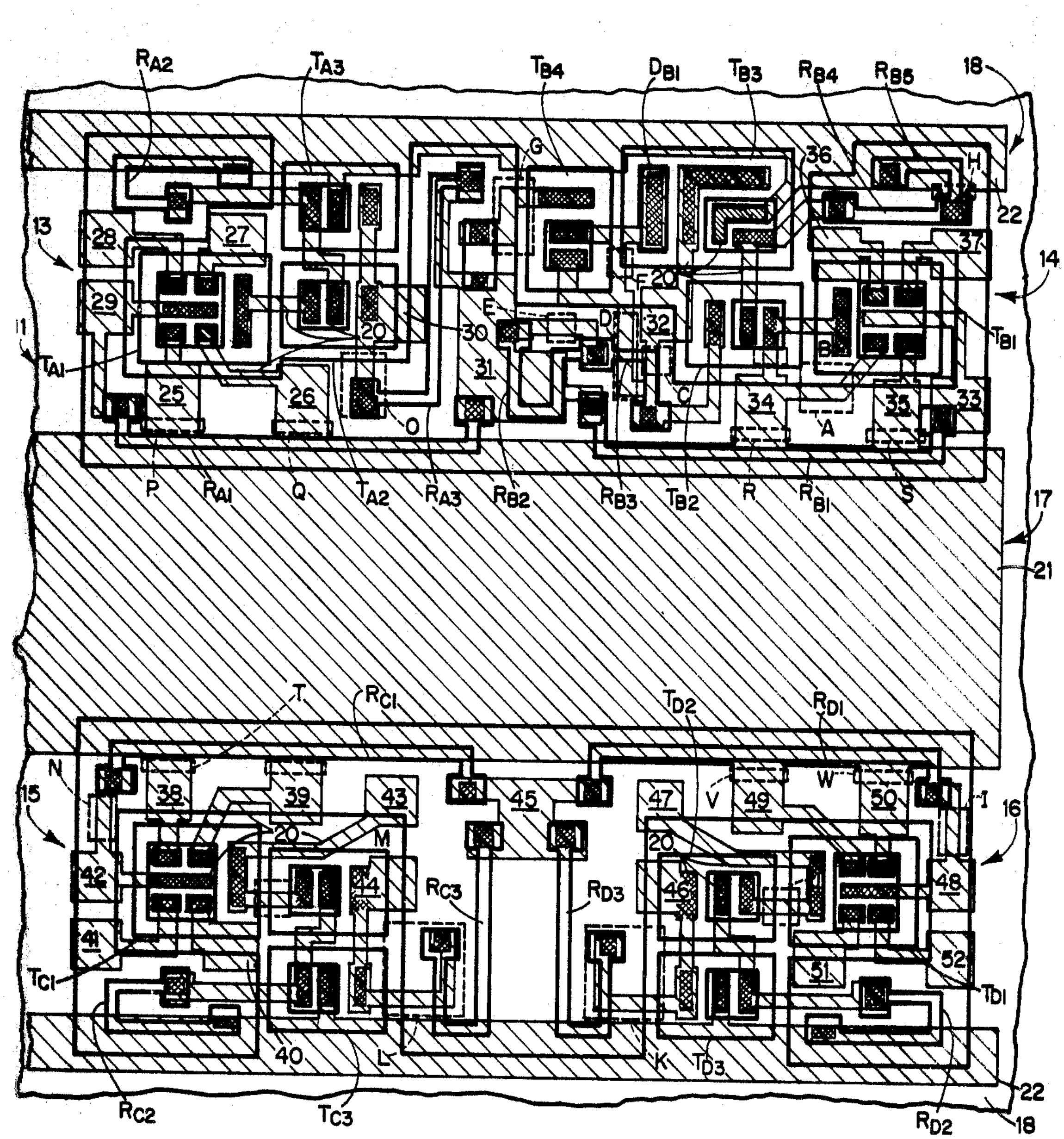
FIG. 3 is a plan view of a fragment of the wafer with a first pattern of conductive material thereon.

In accordance with the method of the invention, identical patterns of conductive member 20 are placed on each cell as illustrated in FIG. 3. The conductive members are fabricated by conventional techniques. Specifically, a layer of aluminum may be applied to the surface of the wafer as by well-known vacuum deposition techniques and then removed from other than the desired areas by conventional photoresist masking and etching procedures.

The conductive members 20 on the surface of the oxide coating make contact to the underlying terminal areas of the components at the openings in the oxide coating as indicated by the closely spaced crisscross-hatched areas in FIG. 3. A large block 21 of conductive material lies over the avenue 17 between the two pairs of groups of components 13 and 14, and 15 and 16. Conductive strips 22 lie over the gaps 18 adjacent the upper and lower edges of the cell.

Figure 3A:
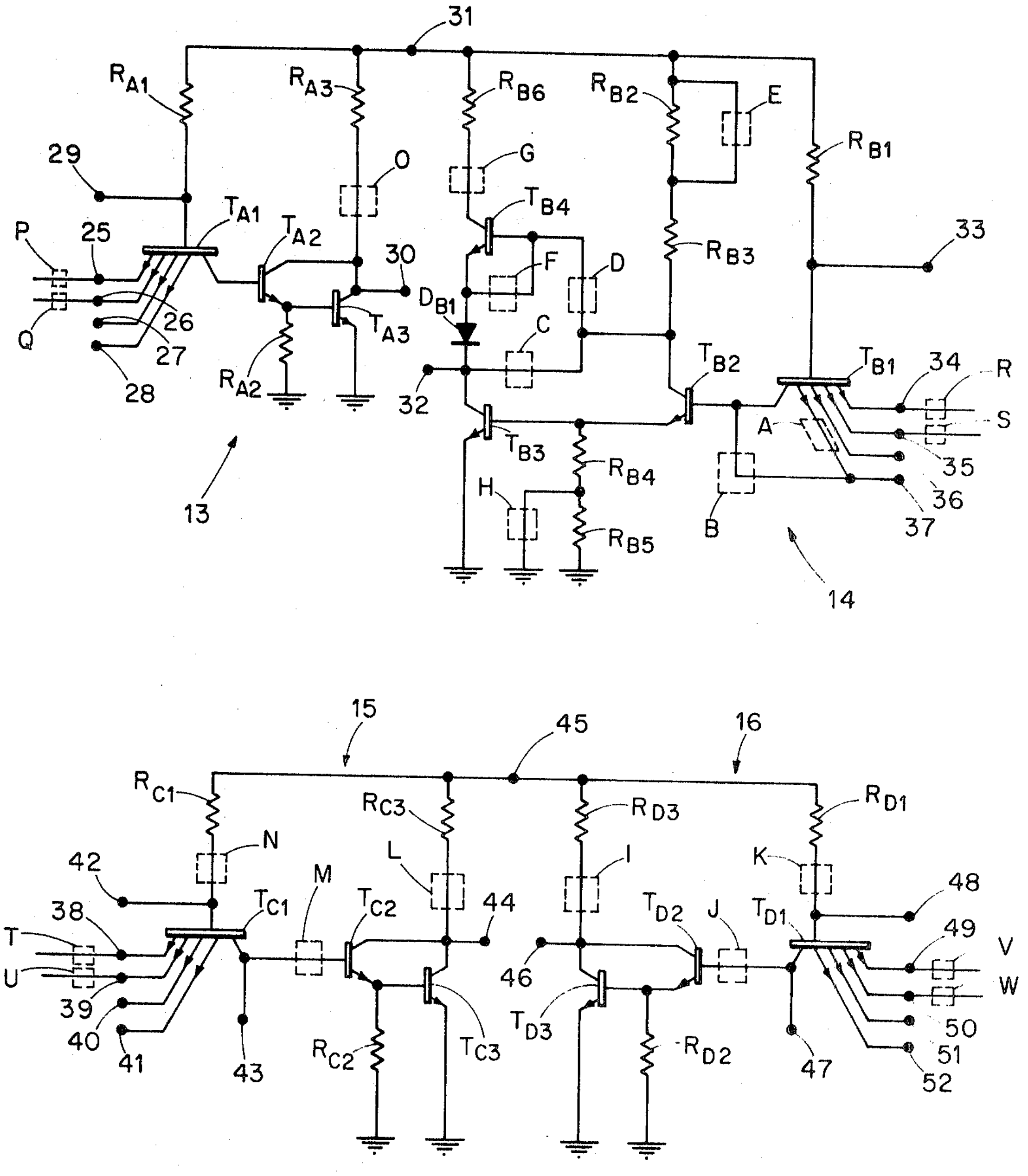
FIG. 3A is an equivalent circuit diagram of the components and interconnections as shown in FIG. 3.

FIG. 3A is a circuit diagram illustrating the electrical equivalent of the cell as shown in FIG. 3. The components in each group are interconnected by conductive members 20 in a manner which provides all the electrical connections for several different possible sets of electrical connections. Certain of the conductive members include enlarged areas to serve as connecting pads 25–52 as will be explained hereinbelow. The reference numbers to the pads shown in FIG. 3 correspond to the reference numbers to the connection points shown in FIG. 3A. The metal strips 22 in the gaps 18 are connected to terminal areas of certain components and provide ground connections for those components. The block 21 of metal is utilized during subsequent processing to provide several discrete conductive paths as will be explained.

Each group of components may be committed to a specific desired logic function by selectively removing appropriate regions of the conductive members. The regions of the conductive members 20 which may be selectively removed to determine the desired logic function of each group are shown within dashed lines in FIG. 3 and FIG. 3A and labeled A through O. (Regions P through W connect certain components to the metal of the block 21, but do not affect the logic functions of any of the groups.) The following table indicates the possible logic functions which can be obtained from each of the four groups of components 13, 14, 15 and 16 by removal of the designated regions of the conductive members 20.

First Group 13

| | |
|---|---|
| Remove O | NAND gate. |
| As shown | Expander gate. |

Second Group 14

| | |
|---|---|
| As shown | (No logic function). |
| Remove B, D, E, G & H | NAND gate. |
| Remove B, C and G | NAND driver gate. |
| Remove B, C and F | NAND buffer gate. |

Third Group 15

| | |
|---|---|
| As shown | NAND gate. |
| Remove L | Expander gate. |
| Remove L, M and H | Single transistor input expander. |

Fourth Group 16

| | |
|---|---|
| As shown | NAND gate. |
| Remove I | Expander gate. |
| Remove I, J and K | Single transistor input expander. |

Prior to removal of any of the regions of the conductive members 20, the conductive members of each cell of the array are the same (each cell appears as illustrated in FIG. 3), and the cells are electrically the same (the circuit of each cell being shown in FIG. 3A). Up to this point in the process every array is the same. Further processing of an array is carried out in accordance with the specific logic functions to be performed by each group of components and the specific interconnections to be provided between groups and between cells in order to form the array into the desired logic subsystem.

In order to form the components of the groups into specific functional arrangements, metal is removed from the appropriate regions of the conductive members of each group. At the same time, metal is removed from the block 21 and, as appropriate, from regions P through W to form a desired arrangement of conductive paths. The metal may be removed by the conventional photoresist masking and etching procedures typically employed in the semiconductor art. These procedures are the same as those employed in defining the conductive pattern illustrated in FIG. 3.

Figure 4:
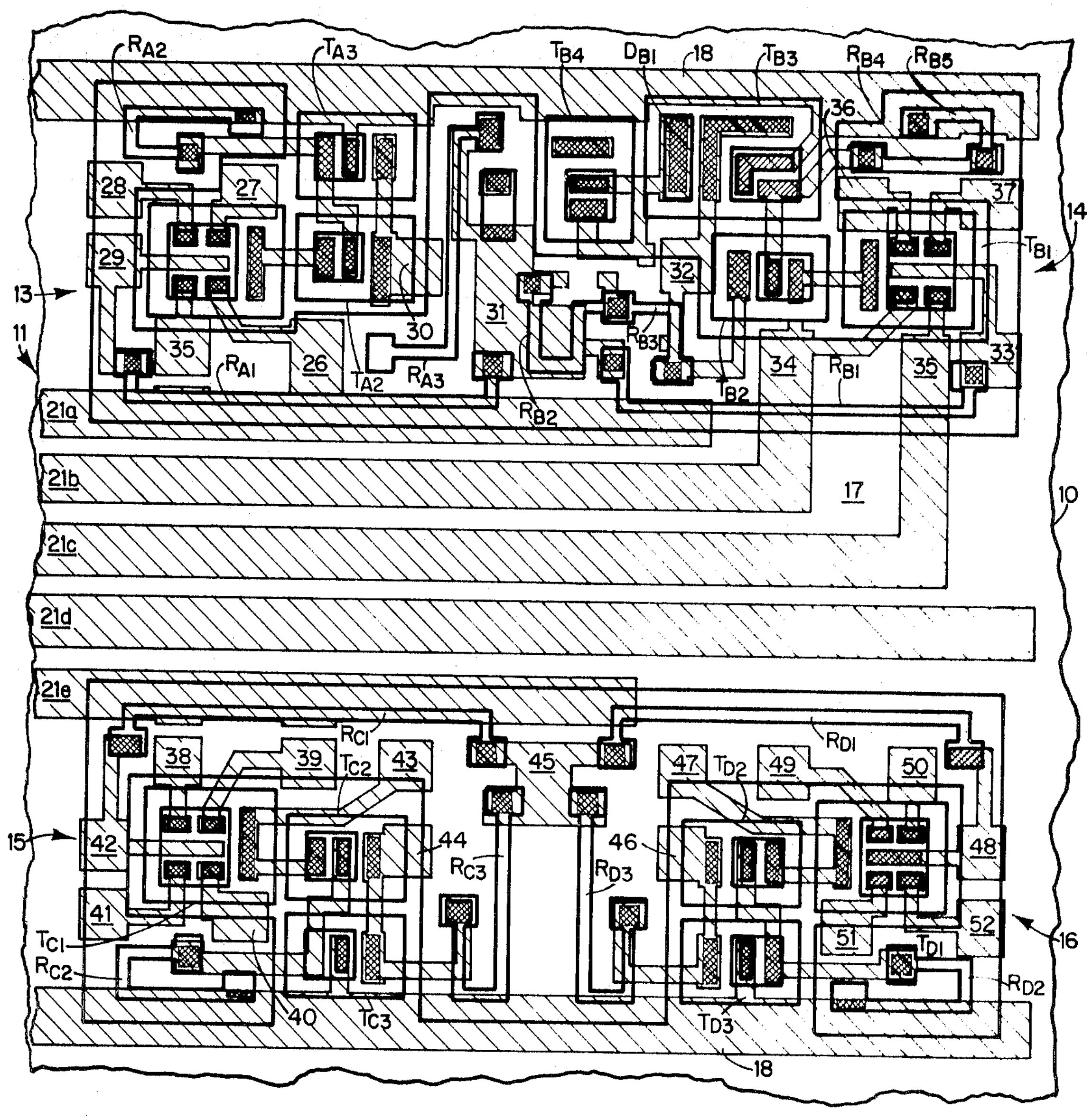
FIG. 4 is a plan view of the fragment of the wafer after selective removal of certain portions of the conductive material.
Figure 4A:
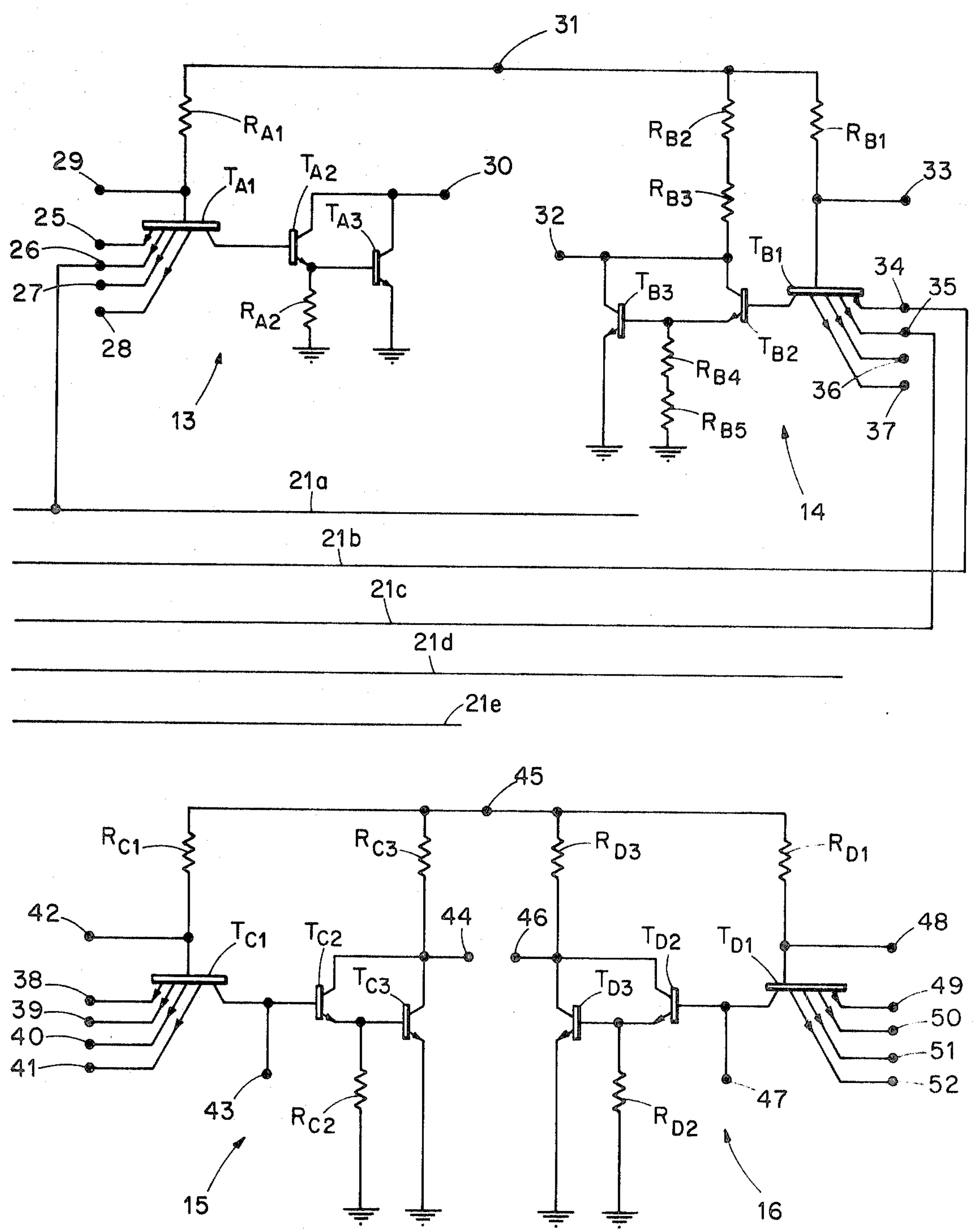
FIG. 4A is an equivalent circuit diagram of the components and interconnections as shown in FIG. 4.

FIG. 4 and the equivalent circuit diagram of FIG. 4A are illustrative of one possible arrangement. The region labeled O in FIGS. 3 and 3A is removed from the conductive members of the first group 13 of components to form the group to an expander gate. The regions labeled B, D, E, G and H in FIGS. 3 and 3A are removed from the conductive members of the second group 14 thus providing a NAND logic gate. No metal is removed from the conductive members of the other two groups 15 and 16, and thus these two groups both function as NAND logic gates.

At the same time, metal is removed from the block 21 to provide five separate conductors 21*a*, 21*b*, 21*c*, 21*d* and 21*e* extending along the avenue 17 between the rows of groups within the cell. As illustrated in FIG. 4, some or all of the conductors 21*a–e* may extend along the avenue 17 for more than one cell. The regions labeled P, T, U, V and W in FIGS. 3 and 3A are also removed to leave only certain desired connections between the emitters of the multi-emitter transistors and the conductors 21*a–e* formed from the block 21 of metal.

In order to complete the electrical connections between the groups of components of each cell and between the cells of the array, another set of conductive paths is required. First, the surface of the wafer is coated with a layer of an adherent non-conductive material as by depositing a layer of silicon oxide or an appropriate glass in a conventional manner. Openings are formed in the layer of non-conductive material as by conventional photoresist masking and etching procedures to expose the desired areas of the connecting pads 25–52 of the conductive members 20 and also portions of the five conductors 21*a–e*. Then the desired pattern of conductors is placed on the layer of non-conductive material as by the conventional procedures of vacuum-depositing a layer of aluminum on the surface and selectively removing the aluminum by the usual photoresist masking and etching techniques.

Figure 5:
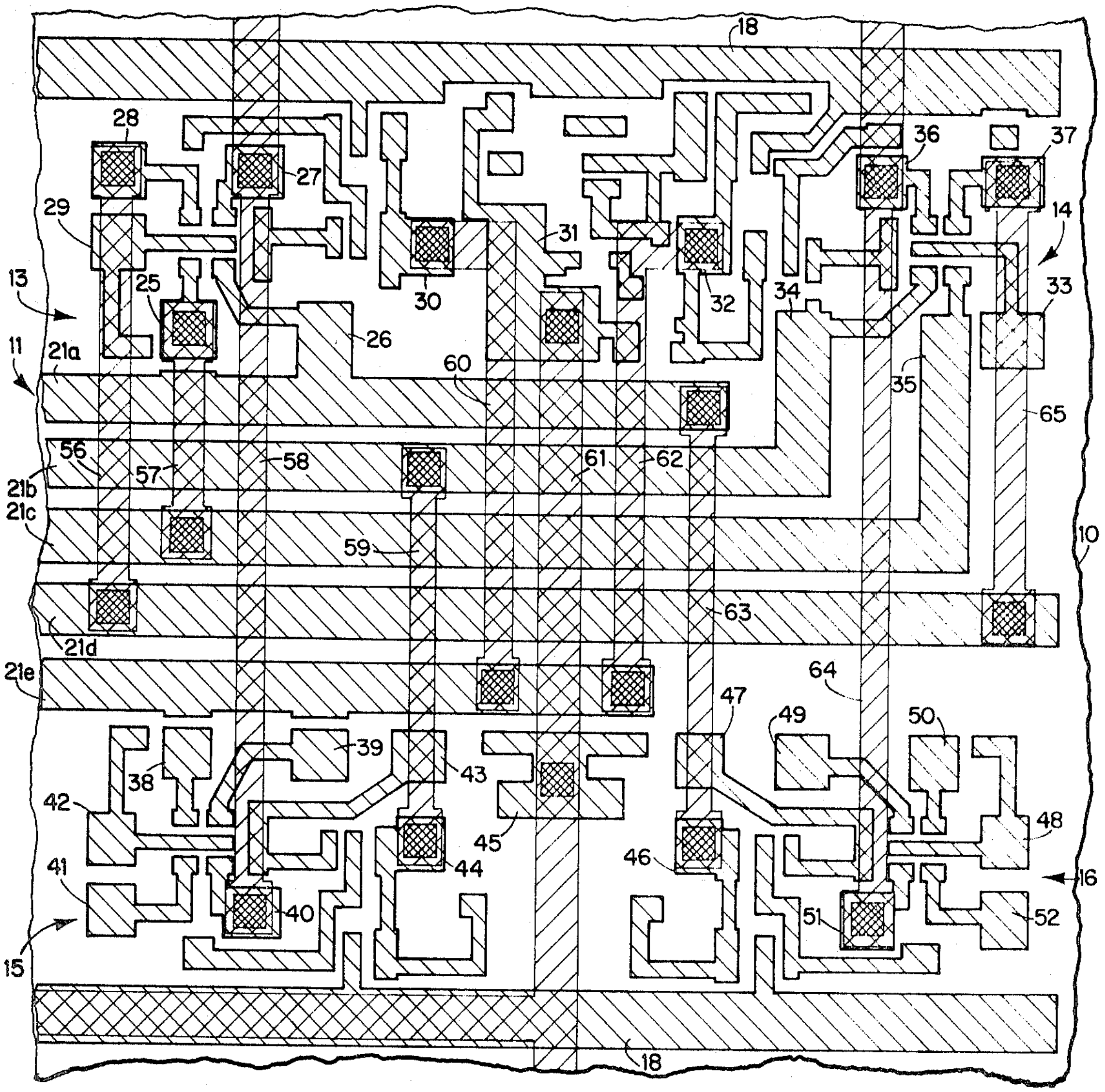
FIG. 5 is a plan view of the fragment of the wafer with a second pattern of conductive material thereon.
Figure 5A:
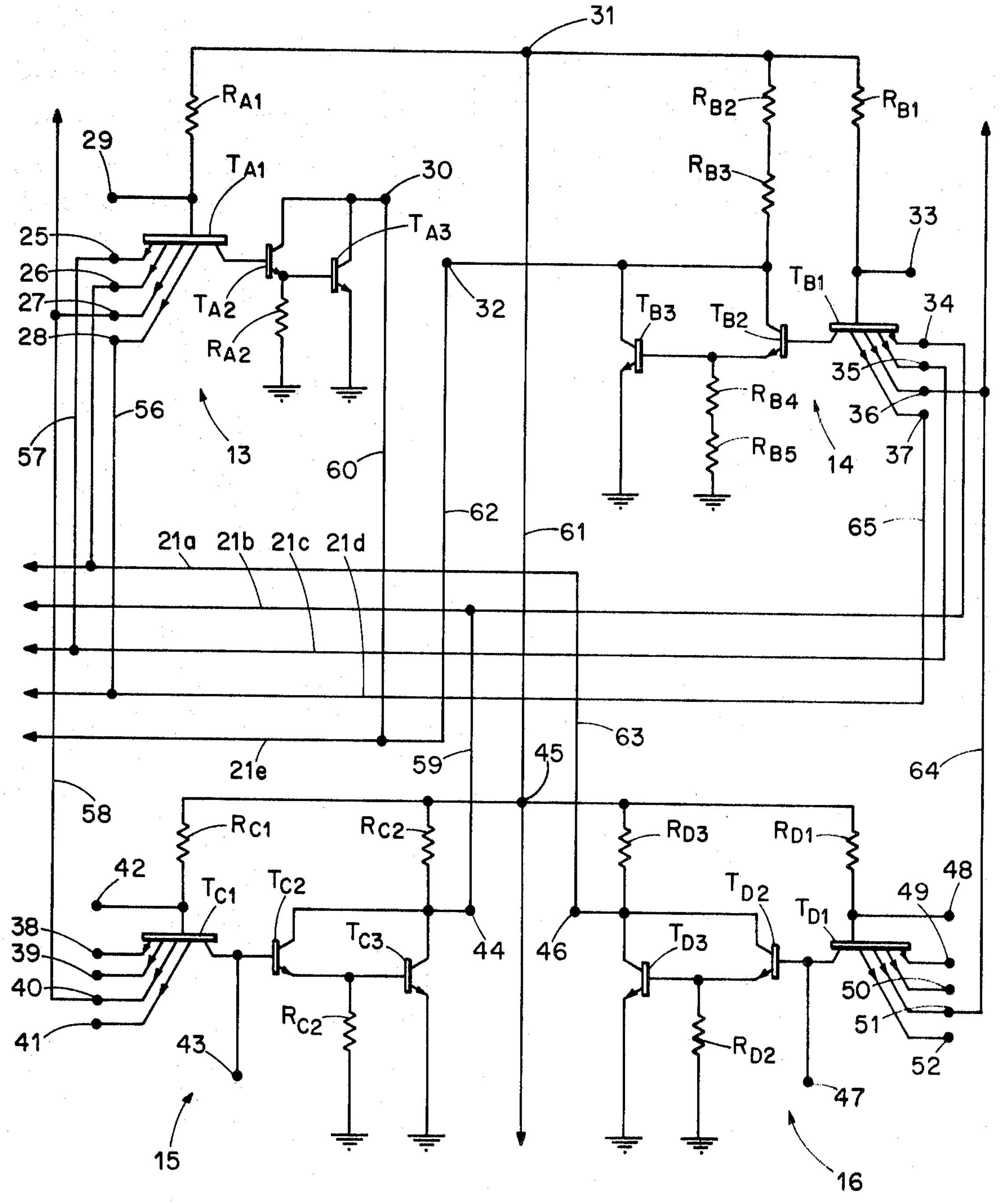
FIG. 5A is an equivalent circuit diagram of the components and interconnections as shown in FIG. 5.

FIG. 5 illustrates one possible pattern of conductive paths 56–65. In FIG. 5 the conductive pattern of the first layer and the conductive pattern of the second layer are shown. The connections between them at the openings in the intervening layer of non-conductive material are indicated by the closely spaced crisscross-hatched areas in FIG. 5. The underlying components are not shown. FIG. 5A is a schematic circuit diagram of the cell with the second layer of conductive paths 56–65.

The conductive paths 56–65 of the second metal layer provide connections between the groups of components of a cell and also provide connections between cells either directly or in conjunction with the conductive paths 21*a–e* of the first metal layer. Although not shown in FIG. 5, metal of the second layer is employed to form the bonding pads 19 (FIG. 1) for connecting the completed subsystem of the array to other circuitry and also to form the conductive paths to the bonding pads. The conductive paths 56–65 of the second layer, except for conductive paths to bonding pads at the side edges of the array, extend generally parallel to the columns of groups and cells and transverse to the conductive paths 21*a–e* of the first layer.

Thus, the method of the invention produces an integrated circuit network having only two layers of metallization and a single intervening layer of non-conductive material. In addition, in practicing the method of the invention, structures may be fabricated through a stage which includes a first pattern of metallization without connecting the structure to any specific electrical arrangement. The generation of a mask for use in the conventional photoresist masking and etching techniques to remove selected regions of the conductive members 20 and sections of the block 21 is relatively simple.

While there has been shown and described what is considered a preferred embodiment of the present invention, it will be obvious to those skilled in the art that various changes and modifications may be made therein without departing from the invention as defined by the appended claims.

I claim:

1. The method of manufacturing an integrated circuit network including the steps of producing a body of semiconductor material having a plurality of groups of components fabricated therein, each of the components having terminal areas in a surface of said body, an adherent non-conductive coating on said surface of the body having openings therein exposing the terminal areas of the components, the components of each group being capable of forming a different functional circuit arrangement for each of several different possible sets of electrical connections between terminal areas of the components of the group;

placing a first layer of conductive material on the non-conductive coating and exposed terminal area in a predetermined pattern of conductive members providing the several different possible sets of electrical connections between the terminal areas of the components of each group, and in a block of conductive material on the non-conductive coating adjacent the groups of said plurality;

selectively removing conductive material of the conductive members and the block to leave conductive members which provide a set of electrical connections for the components of each group whereby the components of each group form a desired functional circuit arrangement, and to leave conductive material of the block which provides a multiplicity of conductive paths;

covering the surface of the conductive material and the uncovered non-conductive coating with a layer of non-conductive material;

removing non-conductive material of the layer to expose selected areas of the first layer of conducting material; and placing a second layer of conductive material on the layer of non-conductive material and on the exposed areas of the first layer of conductive material in a desired pattern of a multiplicity of conductive paths whereby the conductive paths of the first layer and the conductive paths of the second layer provide electrical connections between the groups of components.

2. The method of manufacturing an integrated circuit network in accordance with claim 1 wherein two of the groups of said plurality are spaced apart in said body by an intervening avenue;

the step of placing the first layer of conductive material includes placing conductive material in a block on the non-conductive coating overlying said intervening avenue;

the step of selectively removing conductive material of the conductive members and the block includes removing conductive material to leave conductive material of the block which provides a multiplicity of discrete conductive paths extending in a direction generally along the direction of the length of the avenue; and the step of placing the second layer of conductive material includes placing conductive material in a pattern of conductive paths extending in a direction generally transverse to the conductive paths of the first layer.

3. The method of manufacturing an integrated circuit network in accordance with claim 1 wherein said plurality of groups of components includes four groups of components arranged in two pairs of groups, the groups of each pair being located adjacent each other and the two pairs of groups being spaced apart by an intervening avenue, each group being located adjacent the avenue;

the step of selectively removing conductive material of the first layer includes removing conductive material to leave conductive material of the block which provides a multiplicity of discrete conductive paths extending in a direction generally along the direction of the length of the avenue between the two pairs of groups; and the step of placing the second layer of conductive material includes placing conductive material in a pattern of conductive paths extending in a direction generally transverse to the conductive paths of the first layer whereby the multiplicity of conductive paths of the first layer and the multiplicity of conductive paths of the second layer provide electrical connections between the four groups of components and input and output connections for the plurality of groups.

4. The method of manufacturing an integrated circuit network including the steps of producing a body of semiconductor material having an array of identical cells fabricated therein, each cell including a plurality of groups of components, each of the components having terminal areas in a surface of said body, an adherent non-conductive coating on said surface of the body having openings therein exposing the terminal areas of the components, the components of each group being capable of forming a different functional circuit arrangement for each of several different possible sets of electrical connections between terminal areas of the components of a group;

placing a first layer of conductive material on the non-conductive coating and exposed terminal areas in the same predetermined pattern of discrete conductive members for each cell providing the several different possible sets of electrical connections between the terminal areas of the components of each group, and in a block of conductive material for each cell on the non-conductive coating adjacent each group of the cell;

selectively removing conductive material of the discrete conductive members and the blocks to leave discrete conductive members which provide a set of electrical connections for the components of each group whereby the components of each group form a desired functional arrangement, and to leave conductive material of the blocks which provide a multiplicity of conductive paths from each block;

covering the surface of the conductive material and the uncovered non-conductive coating with a layer of non-conductive material;

removing non-conductive material of the layer to expose selected areas of the first layer of conductive material; and placing a second layer of conductive material on the layer of non-conductive material and on the exposed areas of the first layer of conductive material in a desired pattern of a multiplicity of conductive paths whereby the conductive paths of the first layer and the conductive paths of the second layer provide electrical connections between the groups of components of each cell and between the cells of the array.

5. The method of manufacturing an integrated circuit network in accordance with claim 4 wherein the groups of each identical cell are spaced apart into two sets by parallel intervening avenues;

the step of placing the first layer of conductive material includes placing conductive material in a block on the non-conductive coating overlying the avenue of each cell;

the step of selectively removing conductive material of the discrete conductive members and the blocks includes removing conductive material to leave conductive material of each block which provides a multiplicity of discrete conductive paths in a direction generally along the direction of the lengths of the avenues; and the step of placing the second layer of conductive material includes placing conductive material in a pattern of conductive paths extending in a direction generally transverse to the conductive paths of the first layer.

6. The method of manufacturing an integrated circuit network in accordance with claim 4 wherein the identical cells of the array are arranged in a coordinate matrix of aligned rows and columns and groups of the array are also arranged in a coordinate matrix of aligned rows and columns;

the groups in the cells of each row of cells are spaced apart in two separate rows of groups by an intervening avenue which extends the length of the row of cells;

the step of placing the first layer of conductive material includes placing conductive material in blocks on the non-conductive coating overlying the avenues;

the step of selectively removing conductive material of the discrete conductive members and the blocks includes removing conductive material to leave conductive material of each block which provides a multiplicity of discrete conductive paths extending in a direction generally along the direction of the lengths of the avenues; and the step of placing the second layer of conductive material includes placing conductive material in a pattern of conductive paths extending in a direction generally transverse to the conductive paths of the first layer.

7. The method of manufacturing an integrated circuit network in accordance with claim 6 wherein each identical cell includes four groups of components;

the components of three of the groups of each cell being electrically identical, the components of each of the three groups being capable of forming a NAND gate, an expander gate and a single transistor input expander, the particular circuit arrangement being determined by the set of electrical connections between the terminal areas of the components of the group; and the components of the fourth group of each cell being capable of forming a NAND gate, a NAND driver gate, and a NAND buffer gate, the particular circuit arrangement being determined by the set of electrical connections between the terminal areas of the components of the group.

8. A method of manufacturing an integrated circuit network in accordance with claim 7 wherein each of the three groups of components of each cell having electrically identical components includes three transistors, one of the transistors being a multi-emitter transistor, and three resistors; and the fourth group of components of each cell includes four transistors, one of the transistors being a multi-emitter transistor, a diode, and four resistances, two of the resistances each having an additional terminal area intermediate terminal areas at the ends.

References Cited

UNITED STATES PATENTS

| | | | |
|---|---|---|---|
| 3,304,594 | 2/1967 | Madlaud | 29—577 |
| 3,312,871 | 4/1967 | Seki et al. | 29—577 IC |
| 3,354,360 | 11/1967 | Campagna et al. | 29—577 IC |
| 3,484,932 | 12/1969 | Cook | 29—577 |

JOHN F. CAMPBELL, Primary Examiner

W. TUPMAN, Assistant Examiner

U.S. Cl. X.R.

317—235 E